April 12, 1927.                E. C. HUTCHINSON ET AL                1,624,891

WATER TIGHT SEATING FOR BUTTERFLY VALVES AND SUCH

Filed July 14, 1924

Inventors
E. C. Hutchinson
Charles V. Fowler
By Harry V. Totten
Attorney

Patented Apr. 12, 1927.

1,624,891

UNITED STATES PATENT OFFICE.

ELY C. HUTCHINSON AND CHARLES V. FOULDS, OF OAKLAND, CALIFORNIA, ASSIGNORS TO PELTON WATER WHEEL COMPANY, OF SAN FRANCISCO, CALIFORNIA, A CORPORATION OF CALIFORNIA.

WATER-TIGHT SEATING FOR BUTTERFLY VALVES AND SUCH.

Application filed July 14, 1924. Serial No. 725,772.

The present invention relates to improvements in butterfly valves and such, and more particularly to means for reducing or preventing leakage between the valve disk, when closed, and its seat.

With the extension of hydraulic engineering and construction, particularly for water supply and hydro-electric purposes, butterfly valves have assumed increasing importance as elements of the system of water supply to hydraulic turbines of the impulse and reaction type, and also in the control of water flow from dams and in conduits and the like for all water supply purposes. The nature of the construction of butterfly valves makes it difficult to prevent leakage between the periphery of the disk and the interior circumference or seat of the valve body, and such leakage, in addition to permitting water to pass through when the valve is closed, frequently results in wear of the disk periphery and the seat, this wear being greatly exaggerated if the water contains solid matter of an abrasive nature.

The principal object of the present invention, therefore, is to provide means for reducing to a minimum or preventing leakage past the disk when the valve is closed, thereby minimizing the destructive wear on the edges of the disk and its seat. A secondary object of the invention is to provide means for compensating for such wear as may occur, thereby enabling the valve to be kept tight over a long period of time, and eliminating the necessity for frequent and costly repairs or replacements.

It is to be understood that the form and construction of the device hereinafter described and illustrated in the accompanying drawings may be varied, within the limits of the claims hereto appended, without departing from the spirit of the invention as expressed in said claims.

With this in view a preferred embodiment of our invention will now be fully described with reference to the accompanying drawings, wherein.

Figure 1:
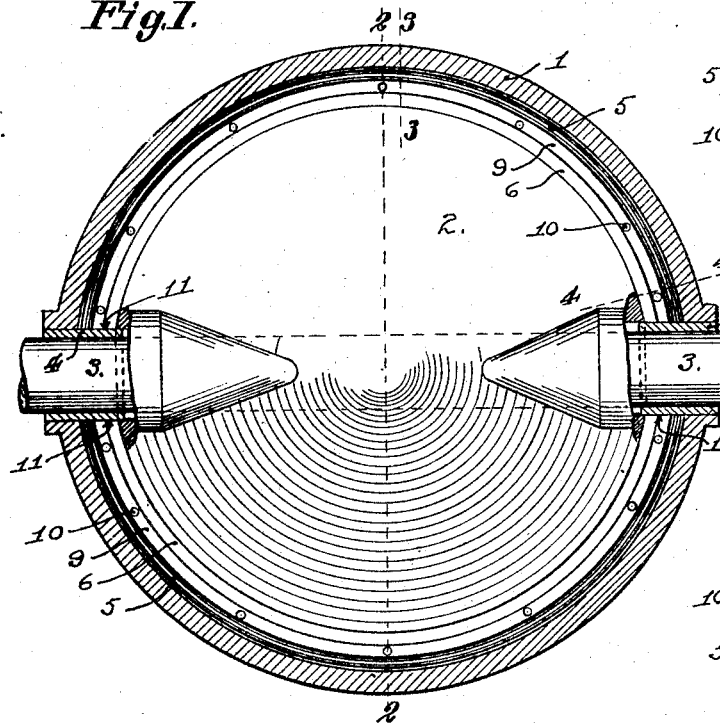
Fig. 1 is a transverse section through a butterfly valve structure, the disk being shown in elevation.
Figure 3:
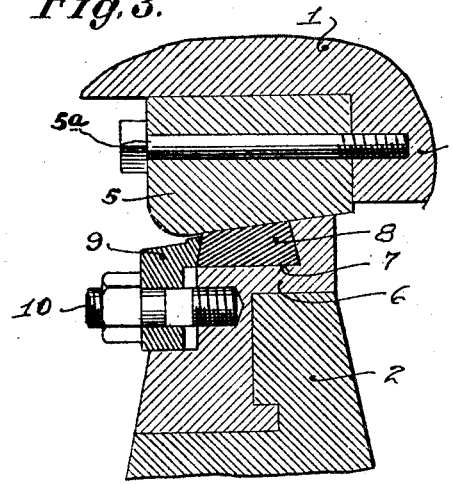
Fig. 3 is an enlarged sectional detail of the peripheral region of the disk and its seat, and is taken on the line 3—3 of Fig. 1.
Figure 4:
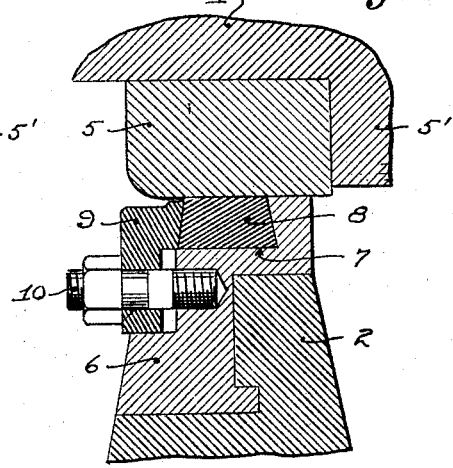
Fig. 4 is an enlarged view similar to Fig. 3, but taken on the line 4—4 of Fig. 1.

In the drawings, the reference numeral 1 designates the valve body, and 2 the valve disk, said disk being carried upon a shaft 3 mounted in bushings 4 in the body 1. Said bushings preferably project beyond the inner periphery of the body 1, as shown in Fig. 1, the disk 2 being suitably recessed to fit closely around them. The body 1 is provided interiorly with semi-circular seat members 5 extending between the bushings 4, and said seat members are oppositely tapered, so that the disk 1 may seat with a wedging action; the opposite tapered faces of the entire seat being parallel. The taper may flatten out to a substantially cylindrical surface in the regions of said bushings, as shown in Fig. 4. The seat members 5, which together constitute, in effect, a ring within the body 1, are removably secured, by any suitable means such as bolts $5^a$ as shown in Figure 3, against the up-stream side of a flange 5' formed interiorly in said body.

Figure 2:
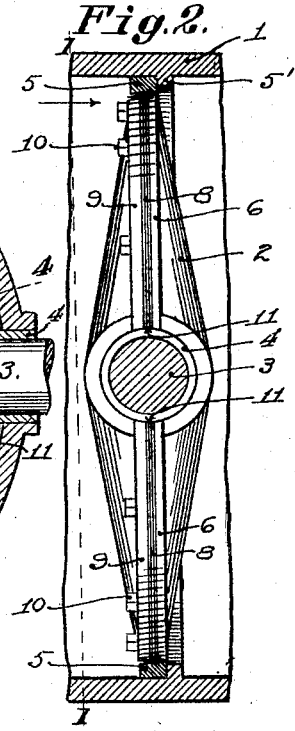
Fig. 2 is a section taken mainly on the line 2—2 of Fig. 1, the disk being shown in elevation.

The disk 2 is preferably provided with a separate peripheral ring 6, or more properly with two segments of a ring, one lying on each side of the shaft 3, said segments being secured to the disk by any suitable means not shown in the drawings. We have found it of advantage, for preventing both leakage and wear, to provide a packing ring preferably formed of some suitable resilient material such as rubber, hemp, flax, cotton, or the like. Such packing is carried in the disk, and for purposes of illustration we have shown, in Figs. 3 and 4, an undercut rabbet 7 formed in the disk ring segments 6, in which the resilient packing ring 8 is seated. A removable and adjustable segmental retaining ring or gland 9, having an undercut face adapted to bear against the side of the packing 8, is secured to the ring segments 6 by suitable means such as threaded studs 10, so that said segmental retaining ring can be drawn up, to compress the packing 8 in the groove formed between it and the side of the rabbet 7. The undercut sides of said groove securely hold said packing in position, and by compressing it by means of the adjustable ring 9, it can be made to protrude beyond the faces of the rings 6 and 9. When the disk is moved to its closed position, said packing wedges firmly against the seat 5, and is compressed so that its surface is flush with the surface of the ring 6, both said packing and said ring 6 seating upon the seat 5 to prevent leakage. Any wear on the exposed surface of said packing can be compensated by laterally compressing it by the retaining ring 9, so that it retains its effectiveness for a long period of time. The ends of the several ring segments 6, 8 and 9 fit closely about the exterior of the fixed bushings 4, as indicated at 11 in Figs. 1 and 2, to prevent leakage at these points.

It should be noted that, on account of the tapered or conical faces of the co-acting seat and disk members, the disk is wedged into its seat when the valve is closed, thereby forming, with the assistance of the packing 8, a tight closure.

Having thus described our invention, what we claim as new and desire to secure by Letters Patent, is:

1. A butterfly valve, comprising a casing having an annular seat portion provided with seating faces inclined relative to the axis of the seat portion, a disc member pivotally mounted on one diameter with the pivot in substantially the plane of said annular seat portion, seat-engaging members mounted on said disc member and having recesses in one side, and inclined seat-engaging faces, and a compressible packing mounted in said recesses, said packing and the inclined faces of the seat-engaging members having seating cooperation in wedging relation with the seating faces of said annular seat portion to provide a water-tight fit in closed position.

2. A butterfly valve, comprising a casing having an inwardly projecting flange formed with an opening, a seating ring removably engaged with said flange formed with valve seating faces inclined with respect to the axis of the casing, a valve disc rotatably mounted on one diameter within the plane of said flange, seat-engaging ring segments mounted on the edge portion of the disc and having annular recesses therein and inclined seat-engaging faces, compressible packing mounted in the recesses in said ring segments, the inclination of said seat-engaging faces and the seating faces decreasing toward the axis of rotation of said valve disc to provide a substantially uniform wedging fit in the closed position of the valve, said packing and seat-engaging faces of the ring segments having seating cooperation with the seating face of said seating rings to prevent leakage in the closed position of the valve.

3. A butterfly valve, comprising a casing having an inwardly projecting flange formed with an opening, bearing sleeves mounted in axial relation at diametrically opposed sides of said opening in said flange and casing, and projecting inwardly in said opening, valve seat ring segments removably secured to said flange at opposite sides of said bearing sleeves and having the ends engaging said sleeves, said segments being provided with inclined seating faces, a valve disc having shafts secured therein and extending from opposite sides, recesses formed in said valve disc concentric to said shafts, said shafts being rotatably received by said sleeves, the inner ends of said sleeves projecting into said recesses in the disc valve to provide a water-tight bearing fit, seat-engaging ring segments mounted on said disc and having their ends terminating adjacent said bearing sleeves, and having inclined seat-engaging faces for seating cooperation with the seating faces of said seat ring segments.

4. A butterfly valve, comprising a casing having an annular seat portion having a seating face, a disc member pivotally mounted in said casing, seat-engaging elements mounted on said disc member and projecting beyond the edge thereof, said elements having seat-engaging faces and recesses therein adjacent said faces, compressible packing mounted in said recesses and adapted with the seat-engaging faces of the elements to engage the seating face in the casing to seal the seating joint between said element and said casing and means for compressing said packing to project the seat-engaging portion thereof outwardly to firmly engage the seat.

5. A butterfly valve, comprising a casing having an annular seat portion formed with a seating face, a disc member pivotally mounted in said casing, seat-engaging elements mounted on said disc member and projecting beyond the edge thereof, said elements having peripheral seat-engaging faces and recesses therein adjacent said faces opening through one side thereof, compressible packing removably positioned in said recesses and means mounted in the recesses for retaining and compressing said packing therein to project a portion of the packing outwardly for cooperation with the elements to seal the sealing joint between said elements and said casing.

In testimony whereof we have signed our names to this specification.

ELY C. HUTCHINSON.
CHARLES V. FOULDS.